(12) United States Patent
Eastlund

(10) Patent No.: US 7,954,955 B2
(45) Date of Patent: Jun. 7, 2011

(54) PROJECTOR LAMP HAVING PULSED MONOCHROMATIC MICROWAVE LIGHT SOURCES

(76) Inventor: Bernard John Eastlund, Saint Louis, MO (US); Sherrie R. Eastlund, legal representative, St. Louis, MO (US)

( * ) Notice: Subject to any disclaimer, the term of this patent is extended or adjusted under 35 U.S.C. 154(b) by 594 days.

(21) Appl. No.: 12/062,834

(22) Filed: Apr. 4, 2008

(65) Prior Publication Data
US 2008/0245976 A1 Oct. 9, 2008

Related U.S. Application Data

(60) Provisional application No. 60/921,791, filed on Apr. 4, 2007.

(51) Int. Cl.
*G02B 21/36* (2006.01)

(52) U.S. Cl. ............... 353/39; 353/98; 353/94; 353/119; 315/312; 315/344; 345/46; 345/82

(58) Field of Classification Search .............. 315/248, 315/312, 344; 353/34, 37, 39, 98, 119; 250/492.24, 250/493.1, 494.1, 505.1; 345/39, 46, 82, 345/83; 349/5, 7, 62–65, 112; 362/27, 31, 362/249.02, 609–613; 359/298, 302, 631, 634, 636

See application file for complete search history.

(56) References Cited

U.S. PATENT DOCUMENTS

| | | | | |
|---|---|---|---|---|
| 6,063,108 | A * | 5/2000 | Salansky et al. | 607/89 |
| 6,547,400 | B1 * | 4/2003 | Yokoyama | 353/98 |
| 6,661,174 | B2 * | 12/2003 | Eastlund et al. | 313/634 |
| 6,707,349 | B1 * | 3/2004 | Huang et al. | 333/113 |
| 6,956,701 | B1 * | 10/2005 | Peterson et al. | 359/618 |
| 7,253,426 | B2 * | 8/2007 | Gorrell et al. | 250/200 |
| 7,400,439 | B2 * | 7/2008 | Holman | 359/298 |
| 7,802,890 | B2 * | 9/2010 | Takada et al. | 353/98 |

* cited by examiner

*Primary Examiner* — Haissa Philogene
(74) *Attorney, Agent, or Firm* — Anthony V S England

(57) ABSTRACT

A light engine for image display projectors has a plurality of monochromatic light sources, typically red, blue and green, combined into one light generation device powered by microwaves pulsed at 3-5 KHz rates. The light engine has a microwave power supply, microwave coupling cavity, a microwave coupler coupling a microwave signal from the microwave power supply to the microwave coupling cavity, and the plurality of monochromatic light sources disposed in the microwave coupling cavity and powered by the microwave signal. The microwave coupling cavity includes a plurality of resonance points, each of the monochromatic light sources being located respectively at one of the resonance points.

6 Claims, 4 Drawing Sheets

PROJECTOR LAMP HAVING PULSED MONOCHROMATIC MICROWAVE LIGHT SOURCES

This application claims the benefit of the priority date of U.S. Provisional Patent Application No. 60/921,791, which was filed on Apr. 4, 2007, and which is hereby incorporated herein by reference.

BACKGROUND OF THE INVENTION

1. Field of Invention

This invention generally relates to light engines for image display projectors

2. Prior Art

The separation of light into usable colors is a critical function incorporated into projector light engines. Various technologies, such as the sequential color wheels, prism systems, etc., have been developed for such separation of colors from full visible spectrum or "white" light. Color wheels are particular to reflective image generation devices ("imagers") such as DLP manufactured by Texas Instruments Corp. and may also used in some LCOS systems available from various suppliers. The light source for projection systems is generally broad spectrum ("white light") sources such as high intensity discharge ("HID") lamps manufactured by Philips and others. These lamps are typically use 75 to 150 watts power and provide adequate light for projection but are generally inefficient, light quality degrades over time, extensive cooling is required and HID lamps have lifetime limitations. An emerging technology is the use of light emitting diodes ("LED"), which are solid-state laser light sources. They can be monochromatic and can be pulsed. Table 1 is a description of typical design requirements for an LED light source as incorporated into a light engine. Ideally at least three separate, monochromatic LED's, usually in red, blue and green, would be used. Each respective color is turned on and off at a frequency of 3 to 5 KHz. LED light sources are limited by the total lumens generated per color and the relatively large size of the emitting region (etendue) required. LED's can be long lived but are generally low efficiency and generate significant beat that must be removed.

TABLE 1

| CURRENT DESIGN TARGETS FOR LED LIGHT SOURCES | | | |
|---|---|---|---|
| Parameter | Target | Comments | 2/07 Add'l Comments CD |
| Total Flux Brightness | (180° Output) Red: ~425 average lumens Green: ~1500 average lumens Blue: ~130 average lumens | Assume duty cycle <60% per color that may be adjusted randomly. Assuming >70% collected in 60 degree cone | Very dependent on source etendue, imager size, screen size and gain. Imager is currently 0.65" diagonal moving to 0.45" diagonal in size. Ultimate target is 1000 nits on screen with 2× gain. |
| LED Emitting Area | ~12 mm^2 for 0.65" imager | Imaged onto a 16:9 device illuminated at ~28° at approx. f/2.0 × f/2.4 | |
| Junction to Case Thermal Resistance | ☐ 1 C/W | Total heat dissipation capability of system heatsink solution is typically ~.5 C/W during operation | |
| Operating Frequency | 2-5 KHz | Typical pulsing rate during operation (per color) is ~2800 Hz. | With color sequential system, switching speed 10 uS (full off to full on) and pulse periods down to 400 uS. |
| Operating Duty Cycle Variability | 1%-60% | May be adjusted randomly (per color) | Per color per frame |
| Operating Ambient Temperature Range | 10-45 C. | Typical conditions - varies by OEM product design requirements | |
| Operating Lifetime | Minimum: 20,000 Hrs Typical: 60,000 Hrs | Target 60K hours as minimum | |
| Operating Current Variability | 0%-100% | Operating current may vary randomly - Ohmic Resistance must be low enough to support stable turn on at low current levels | |
| Die placement tolerance to package alignment features | Rotation: TBD X/Y: TBD | | |
| Target Output Wavelengths | Red: ~620-630 nm Green: ~520-540 nm Blue: ~455-465 nm | Nominal Output Wavelengths (per color) utilizing the best combination of wavelength, duty cycle, and intensity for maximum brightness | |

3. Objectives

This invention is a method and apparatus for producing a light engine with three separate monochromatic light sources, typically red, blue and green, combined into one light generation device powered by microwaves pulsed at 3-5 KHz rates. The individual light sources are cylindrical or spherical in shape with internal dimensions in any direction generally less than 0.6 mm. They would generally generate power densities exceeding 15,000 watt/cm$^3$.

SUMMARY

The principal claim is a light engine with three separate, microwave powered, pulsed, monochromatic light sources, typically one each in red, green and blue. The light sources are lamps that contain selected light generating materials in a background inert gas contained within sapphire or quartz envelopes.

Another principal claim is a new light source, which is microwave powered, pulsed, and either broad spectrum or monochromatic, with applications for light generation in image display projection system, medical or other industrial uses.

Another principal claim is a microwave powered light engine incorporating three separate monochromatic lamps, with a waveguide coupling structure that has three spatially separated resonance locations, and a power supply that can be controlled to adjust the phase of the microwaves by means of an electronic digital phase shifter used to sequentially shift the phase of the microwaves in order to concentrate the power at the three spatially separated resonance locations corresponding to the location of the lamps.

Another principal claim is a sapphire envelope lamp with a fill of $ZnCl^2$, or $ZnBr^2$ and Xenon to produce emission primarily in the red spectrum between 620 and 630 nm. It may include a blocking filter to transmit only the radiation within the 620 to 630 nm band.

Another principal claim is a sapphire envelope lamp with a fill of $ThCl^2$, or $ThBr^2$ and Xenon to produce emission primarily in the green spectrum between 520 and 540 nm. It may include a blocking filter to transmit only the radiation within the 520 to 540 nm band.

Another principal claim is a sapphire envelope lamp with a fill of $InCl^2$, or $InBr^2$ and Xenon to produce emission primarily in the blue spectrum between 455 and 465 nm. It may include a blocking filter to transmit only the radiation within the 455 to 465 nm band.

A summary comparison of this new light source with the LED specifications above is as follows:

TABLE 2

| TRICOLOR MICROWAVE LAMP DESIGN VERSUS LED REQUIREMENTS | | | |
|---|---|---|---|
| Parameter | Target | Comments | GEM Lamp Performance |
| Total Flux Brightness | (180° Output) Red: ~425 average lumens Green: ~1500 average lumens Blue : ~130 average lumens | Assume duty cycle <60% per color that may be adjusted randomly. Assuming >70% collected in 60 degree cone | Maximum dimension is 0.6 mm in major dimension in order to better etendue match with imagers 0.65" or less in diagonal. Red ~1000 average lumens Green ~10,000 average lumens Blue ~2500 average lumens (More if desired) |
| LED Emitting Area | ~12 mm^2 for 0.65" imager | Imaged onto a 16:9 device illuminated at ~28° at approx. f/2.0 × f/2.4 | Emitting area about 0.36 mm$^2$ |
| Junction to Case Thermal Resistance | 1 C/W | Total heat dissipation capability of system heatsink solution is typically ~.5 C/W during operation | N/A Total power input is about 40 watts to generate lumens indicated above. |
| Operating Frequency | 2-5 KHz | Typical pulsing rate during operation (per color) is ~2800 Hz. | Three separate color sources with a 3-15 KHz switching capability with 10 μS from full off to full on with arbitrary off periods. |
| Operating Duty Cycle Variability | 1%-60% | May be adjusted randomly (per color) | Arbitrary duty cycle possible |
| Operating Ambient Temperature Range | 10-45 C. | Typical conditions - varies by OEM product design requirements | 10-45 C. |
| Operating Lifetime | Minimum: 20,000 Hrs Typical: 60,000 Hrs | Target 60K hours as minimum | 20,000 to 60,000 Hrs, higher end of range with sapphire envelope lamps. |
| Operating Current Variability | 0%-100% | Operating current may vary randomly - Ohmic Resistance must be low enough to support stable turn on at low current levels | No such limitation |
| Die placement tolerance to package alignment features | Rotation: TBD X/Y: TBD | | N/A |

TABLE 2-continued

TRICOLOR MICROWAVE LAMP DESIGN VERSUS LED REQUIREMENTS

| Parameter | Target | Comments | GEM Lamp Performance |
|---|---|---|---|
| Target Output Wavelengths | Red: ~620-630 nm Green: ~520-540 nm Blue: ~455-465 nm | Nominal Output Wavelengths (per color) utilizing the best combination of wavelength, duty cycle, and intensity for maximum brightness | Red ~620-630 nm Green ~520-540 nm Blue ~455-465 nm |

BRIEF DESCRIPTION OF THE DRAWINGS

FIG. 2 illustrates how the position of the resonance changes with time, according to an embodiment of the present invention.

DESCRIPTION

The Tricolor Microwave Lamp light Engine comprises, for example, the following components:

1. Three separate lamps that use single crystal sapphire or quartz envelopes:
    One lamp which emits light in the red spectrum, between 620 and 630 nm with a fill of one or more of ZnCl2 or ZnBr2 and one or more of Argon or Xenon background gases.
    One bulb which emits light in the green spectrum, between 420 and 540 nm with a fill of one or more of TlCl2 or TlBr2 and one or more of Argon and Xenon background gases.
    One bulb which emits light in the blue spectrum, between 455 and 465 nm with a fill of one or more of InCl2 or InBr2 and one or more of Argon and Xenon background gases.
2. A microwave coupling cavity with three separate resonance positions that are determined by the geometry of the resonance cavity and the phase of the microwaves within the cavity.
3. A microwave power supply that can be pulsed in time and changed in phase by means of electronic controls.
4. The three lamps located in three separated positions in the wall of the coupling cavity that generate monochromatic light when the microwaves are focused on the respective lamps.
4. Optics to collect and focus the light emission from each lamp onto a common optical path.
5. Band pass filters to remove all light that is not in the desired spectrum band.

Figure 1:
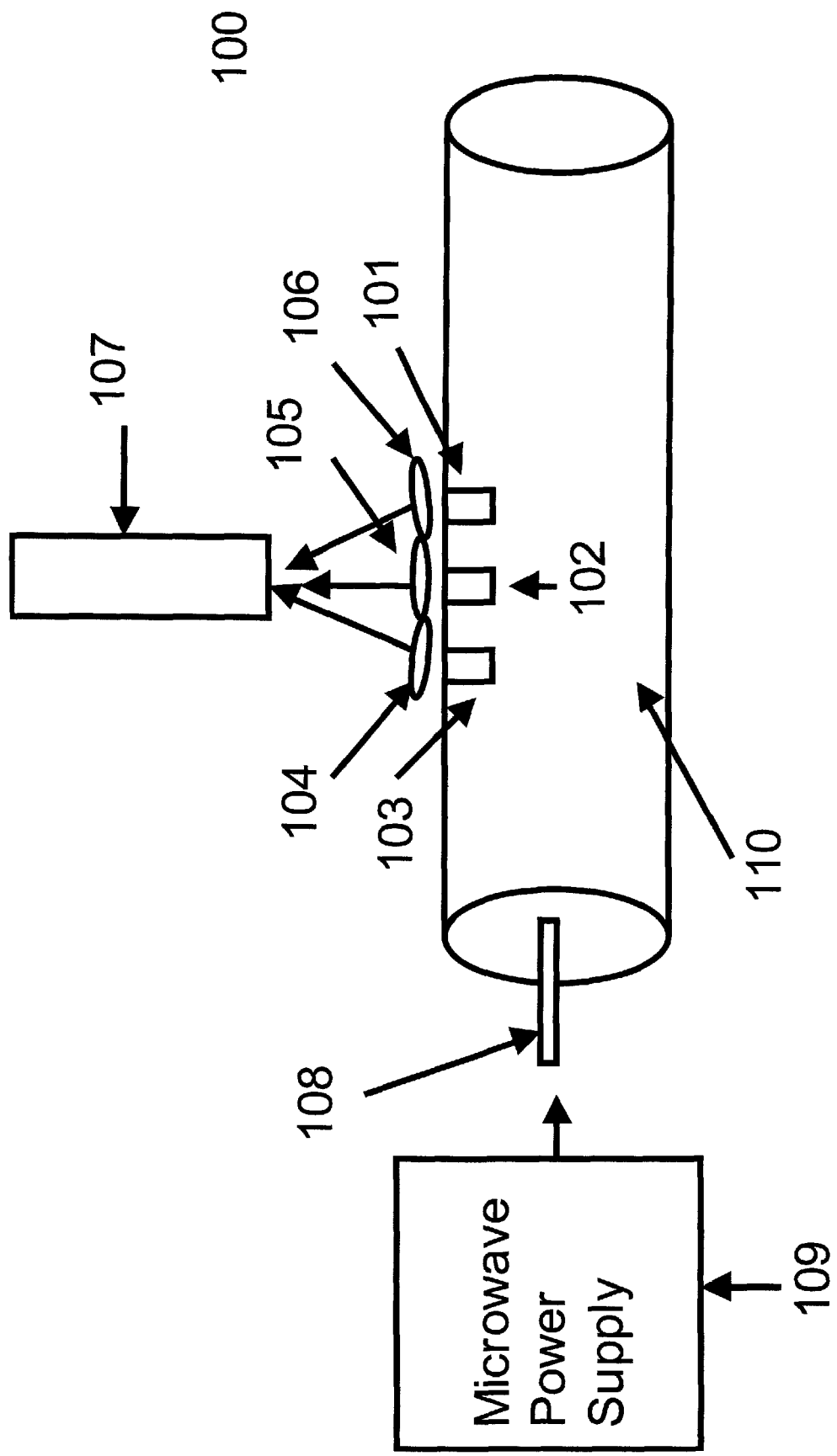
FIG. 1 illustrates a tricolor microwave lamp engine system, according to an embodiment of the present invention.
Figure 2:
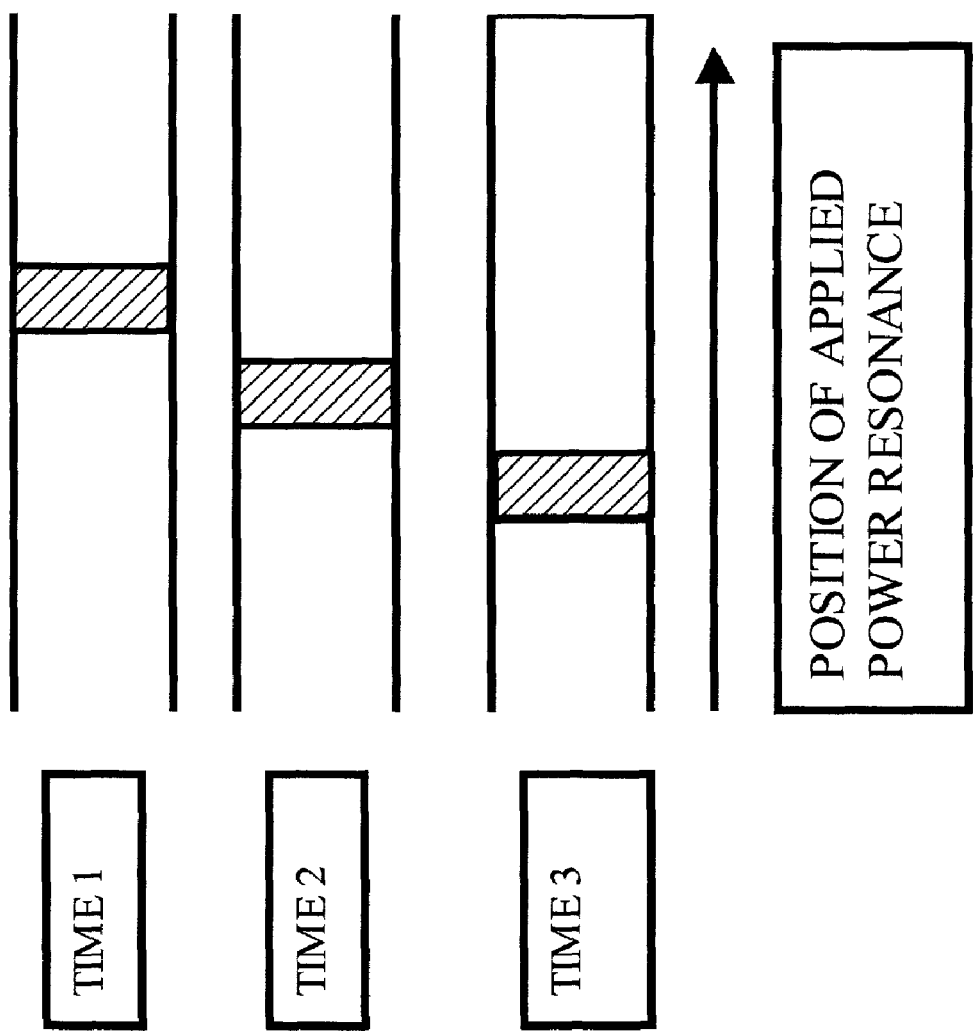
FIG. 2 illustrates
Figure 4:
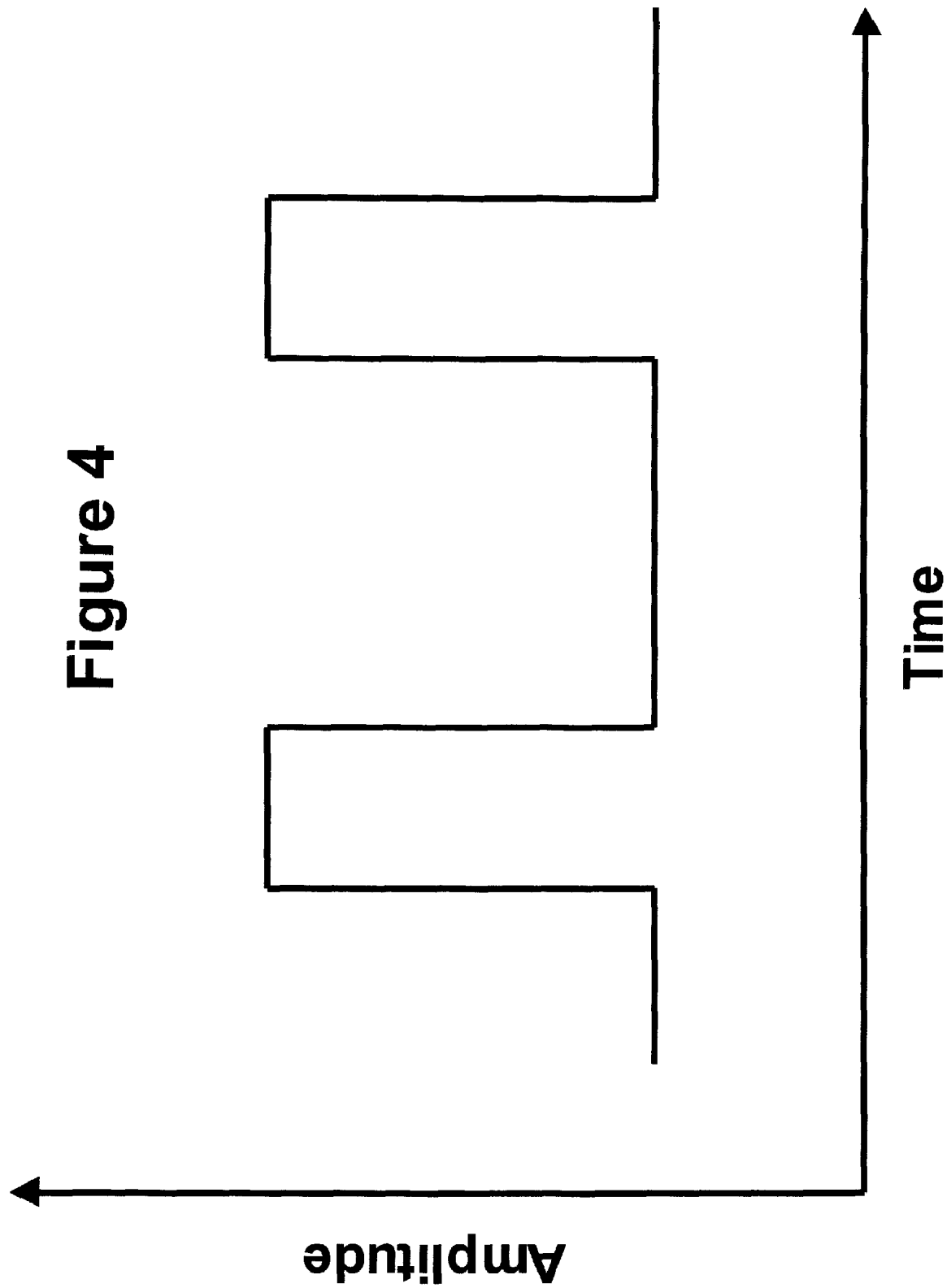
FIG. 4 illustrates a microwave pulse as a function of time, according to an embodiment of the present invention.

FIG. 1 is a schematic drawing of tricolor microwave lamp engine system 100. A microwave coupling cavity 110 has resonance points at three positions. Lamps 101, 102 and 103 are depicted located at three such positions. FIG. 2 illustrates how the position of the resonance changes with time. As the phases of the microwaves are changed the position of highest concentration within the microwave coupling cavity 110 physically moves to a different position. The spatial position of the maximum amplitude of the microwaves is shown for three separate times in FIG. 2. The microwave pulse is depicted in FIG. 4 as a function of time. When the phases are changed in sequence, the colors emitted from the light engine move sequentially from red to green to blue in any desired pattern. The duration of each pulse, the time between pulses and the phase are all independently electronically controlled.

A microwave power supply 109 feeds microwaves to a microwave coupler 108. The light generated by each respective lamp is directed through a lens, which may be coated with a band pass filter material to eliminate light outside of the desired spectrum. The lens focuses the monochromatic light on an optical guide 107 that directs the light into the optical system of a projector. The lens 104 focuses the light from lamp 103. The lens 105 focuses the light from lamp 102. The lens 106 focuses the light from 101.

Figure 3:
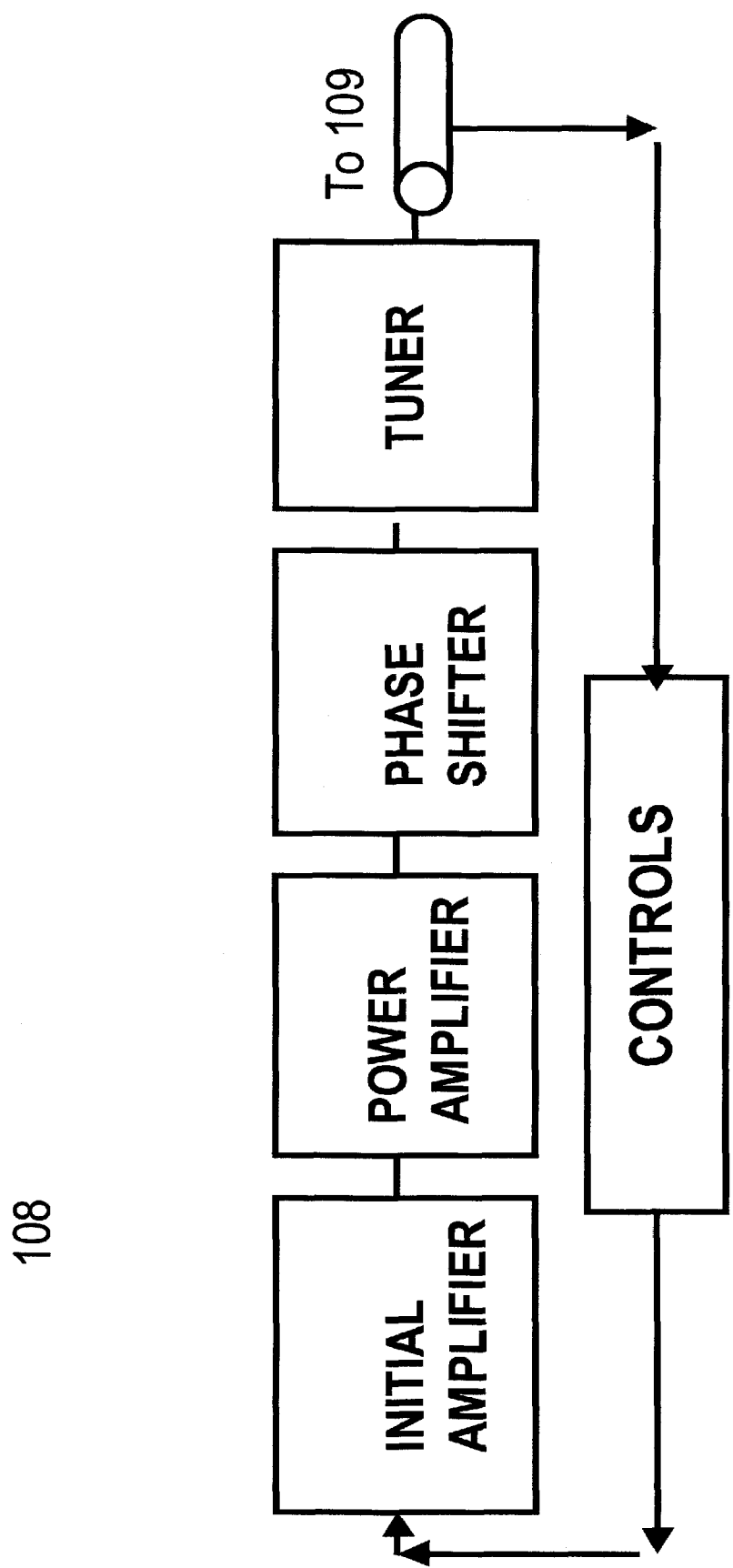
FIG. 3 illustrates a microwave power supply, according to an embodiment of the present invention.

A schematic drawing of the elements of the microwave power supply are shown in FIG. 3. A key element of this power supply is an electronic microwave phase shifter that allows the phase shift to be programmed digitally.

EXAMPLE 1

The lamp is designed to ignite and emit light during a pulse such as that shown in FIG. 4. The lamp turns off when the intensity of the microwave pulse at that position approaches zero. Previous experiments by Dr. Eastlund have demonstrated that when operating in such a mode power levels of ~70,000 watts/cm$^3$ can be coupled onto a lamp.

It is advantageous for small DLP or LCOS imaging devices, less than 0.65" in diameter, to have the dimensions of the emitting area from a light source as small as possible while providing sufficient light to project the image generated by the system onto a viewing surface.

With a cylindrical envelope lamp of the subject invention having an internal dimension of approximately 0.3 mm and a length of approximately 0.6 mm, the light output as a function of wavelength is projected to be:

For red between 620 and 630 nm: 1000 lumens (assuming 50 lumens/watt)

For green between 520 and 540 nm: 10000 lumens (assuming 500 lumens/watt)

For blue between 455 and 465 nm: 2500 lumens (assuming 250 lumens/watt)

The lumens/watt is based on the CIE luminous efficiency curve for day vision.

What is claimed:

1. An apparatus, comprising:
   a microwave power supply;
   a microwave coupling cavity;
   a microwave coupler coupling a microwave signal from the microwave power supply to the microwave coupling cavity, wherein the microwave coupling cavity includes a plurality of resonance points; and
   a plurality of monochromatic light sources disposed in the microwave coupling cavity and powered by the microwave signal, each of the monochromatic light sources being located respectively at one of the resonance points.

2. The apparatus of claim 1, wherein the monochromatic light sources include a red light source, a blue light source, and a green light source.

3. The apparatus of claim 1, wherein the monochromatic light sources are pulsed at a rate that is from 3-5 KHz.

4. The apparatus of claim 1, further comprising means for selectively changing a position of a resonance of the microwave signal from one of the resonance points to another one of the resonance points within the coupling cavity.

5. The apparatus of claim 1, further comprising a means of light collection, a lens or lenses for focusing the light from the plurality of monochromatic light sources into an optical guide.

6. The apparatus of claim 4, wherein the means for selectively changing includes a digital phase shifter.

* * * * *